(12) United States Patent
Castellino et al.

(10) Patent No.: US 10,682,639 B2
(45) Date of Patent: Jun. 16, 2020

(54) METHOD FOR PREPARING A CATALYST-CONTAINING CERAMIC FILTER FOR OFF-GAS OR EXHAUST GAS CLEANING

(71) Applicant: Haldor Topsøe A/S, Kgs. Lyngby (DK)

(72) Inventors: Francesco Castellino, Birkerød (DK); Michael Boe, Klampenborg (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/760,278

(22) PCT Filed: Sep. 28, 2016

(86) PCT No.: PCT/EP2016/073100
§ 371 (c)(1),
(2) Date: Mar. 15, 2018

(87) PCT Pub. No.: WO2017/055344
PCT Pub. Date: Apr. 6, 2017

(65) Prior Publication Data
US 2018/0250665 A1    Sep. 6, 2018

(30) Foreign Application Priority Data

Oct. 2, 2015    (DK) .................................. 2015 00606

(51) Int. Cl.
*B01J 37/34*    (2006.01)
*B01J 37/02*    (2006.01)
(Continued)

(52) U.S. Cl.
CPC .......... *B01J 37/346* (2013.01); *B01D 53/864* (2013.01); *B01D 53/8628* (2013.01);
(Continued)

(58) Field of Classification Search
CPC ...... B01J 37/346; B01J 35/0006; B01J 23/22; B01J 23/44; B01J 37/0213; B01J 35/04;
(Continued)

(56) References Cited

U.S. PATENT DOCUMENTS 6,803,340 B2 * 10/2004 Lee .................... B01D 53/8662
502/309
7,601,671 B2    10/2009 LaBarge
(Continued)

FOREIGN PATENT DOCUMENTS

CN    1027628827 A    10/2012
SE    508 464 C2    10/1998
(Continued)

OTHER PUBLICATIONS

S. Ying, "Microwave Heating and Microwave Drying." National Defense Industry Press, pp. 33-34, Oct. 31, 1976. (in Chinese).

*Primary Examiner* — Haytham Soliman
(74) *Attorney, Agent, or Firm* — Blank Rome LLP

(57) ABSTRACT

A catalyst-containing ceramic dust filter for off-gas or exhaust gas cleaning is prepared by a method comprising the steps of making a water-based impregnation slurry, which comprises a catalytically effective amount of at least one catalytically active metal and an oxide support, to form a catalytically active metal oxide support, impregnating the filter substrate with the impregnation slurry, spraying from the inside to control the amount of liquor while leaving the outer few millimeters of the filter wall dry, and drying the impregnated filter. The impregnated filter is preferably dried by using microwave energy.

7 Claims, 3 Drawing Sheets

Figure 1:
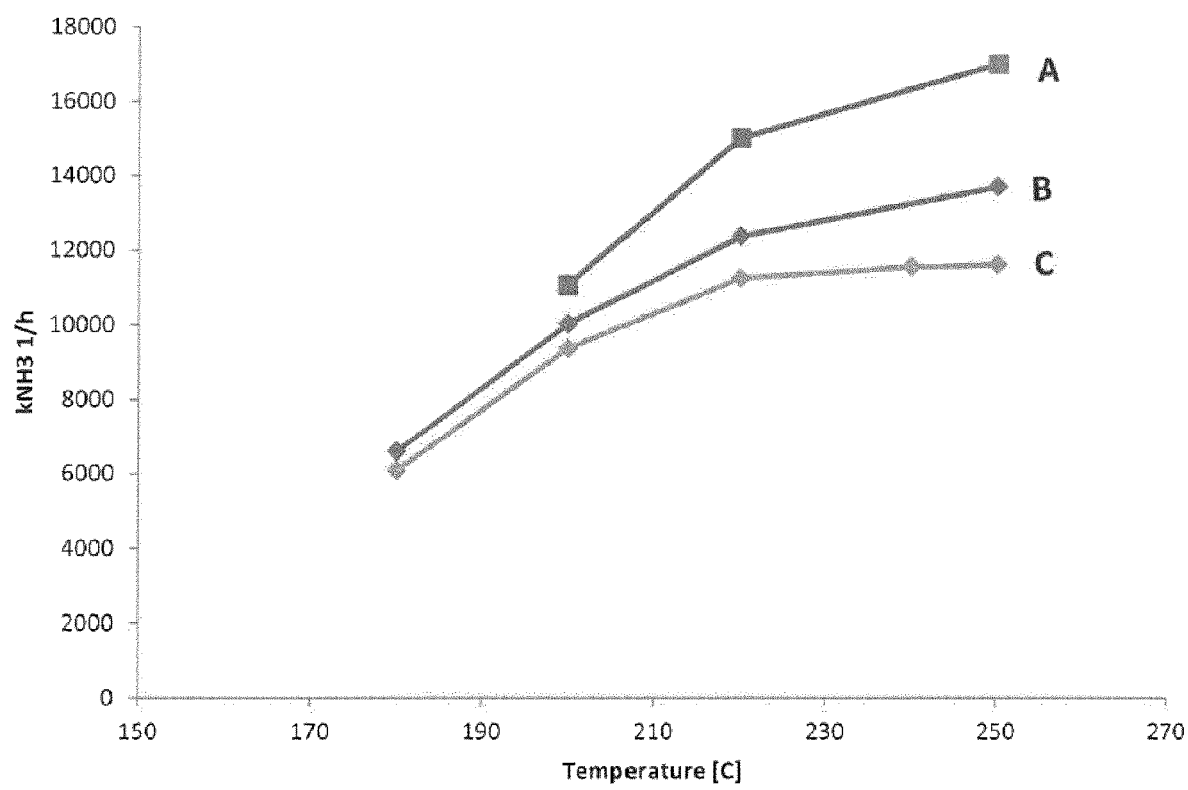

(51) Int. Cl.
*B01J 23/44* (2006.01)
*B01J 35/04* (2006.01)
*B01D 53/86* (2006.01)
*B01J 35/00* (2006.01)
*B01J 23/22* (2006.01)
*B01J 21/06* (2006.01)
*B01D 53/94* (2006.01)
*F01N 3/20* (2006.01)

(52) U.S. Cl.
CPC ....... *B01D 53/8668* (2013.01); *B01D 53/944* (2013.01); *B01D 53/9418* (2013.01); *B01J 21/063* (2013.01); *B01J 23/22* (2013.01); *B01J 23/44* (2013.01); *B01J 35/0006* (2013.01); *B01J 35/04* (2013.01); *B01J 37/0213* (2013.01); *B01J 37/0236* (2013.01); *F01N 3/2066* (2013.01); *B01D 53/8634* (2013.01); *B01D 53/94* (2013.01); *B01D 2255/1023* (2013.01); *B01D 2255/20707* (2013.01); *B01D 2255/20723* (2013.01); *B01D 2255/20776* (2013.01); *B01D 2255/915* (2013.01); *B01D 2257/404* (2013.01); *B01D 2257/502* (2013.01); *B01D 2257/708* (2013.01); *B01D 2258/0291* (2013.01)

(58) Field of Classification Search
CPC ............. B01J 37/0236; B01D 53/9418; B01D 53/8668; B01D 53/944; B01D 53/864; B01D 53/8628; B01D 2257/708; B01D 2257/404; B01D 2257/502; B01D 2255/1023; B01D 2255/20707; B01D 2255/20723; F01N 3/2066
USPC .......................................................... 502/5
See application file for complete search history.

(56) References Cited

U.S. PATENT DOCUMENTS

| | | |
|---|---|---|
| 2004/0001919 A1 | 1/2004 | Aderhold et al. |
| 2004/0162218 A1 | 8/2004 | Choi |
| 2009/0155475 A1 | 6/2009 | Goshima et al. |

FOREIGN PATENT DOCUMENTS

| | | | |
|---|---|---|---|
| WO | WO-2012176161 A1 * | 12/2012 | ............. B01D 53/56 |
| WO | WO 2015/136461 A2 | 9/2015 | |
| WO | WO 2015/140305 A1 | 9/2015 | |

* cited by examiner

METHOD FOR PREPARING A CATALYST-CONTAINING CERAMIC FILTER FOR OFF-GAS OR EXHAUST GAS CLEANING

The present invention relates to a novel method for preparing a catalyst-containing ceramic filter for off-gas or exhaust gas cleaning. More particularly, the invention provides a catalytic ceramic filter for the removal of dust and particulate matter in a process off-gas or an engine exhaust gas. The catalytic ceramic filter is in particular useful in the cleaning of process gas or raw gas from industrial processes involving combustion, like the production of minerals, glass, cement, waste incineration, or from coal fired boilers and engines.

Ceramic filters in the shape of filter candles are used in many industries for removal of particulate matter from process gases. They constitute one of the most efficient types of dust collectors available, and they can achieve collection efficiencies of more than 99% for particulates. The filters can be made from various ceramic materials which comprise ceramic fibres made of alkali and alkaline earth silicates or alumino silicates.

Waste gas from industrial processes, such as municipal waste incinerators, is filtered to remove contaminants like dioxins, furans, nitrous oxides, dust, soot and other toxic and noxious substances, thereby enabling the waste gases to be more safely released into the atmosphere. Traditionally, gaseous pollutants have been removed by a process of gas scrubbing by injecting a reactant particulate material into the waste gas, said material reacting chemically and/or physically with the gaseous pollutants to produce a particulate reaction product. The waste gas containing the reaction product is then filtered through a barrier filter, such as a textile, a metal or a ceramic medium, with the reaction product and any solid pollutants being retained as a dust cake on the surface of the filter. This has the disadvantage that it involves handling and injection of a powder or slurry reactant material and the subsequent removal of the dust cake from the surface of the filter. The dust cake is usually removed by back-pulsing clean air under pressure through the filter which results in an increase in energy requirements for cleaning and for filtration because the dust cake presents a pressure drop penalty as it provides a more impermeable layer to the gas flow, thereby requiring extra energy to pull clean gas through the cake and filter. Furthermore, after cleaning there is no build-up of reactant material at the surface of the filter, which in use would provide a reactant bed for the removal of pollutants. This enables pollutants to more readily pass untreated through the filter until the reactant layer can be built up again.

Particle-containing process gases very often contain a plurality of pollutants, e.g. $NO_x$, volatile organic compounds (VOC), $SO_2$, CO and $NH_3$, in concentrations that have to be reduced depending on local legislation. For this purpose, several conventional methods are available.

The abatement of gaseous contaminants, such as $NO_x$, VOC, CO and $NH_3$, can be effectively carried out by contact with a catalyst. In particular, vanadium oxide-based catalysts are commonly used as catalysts for $NO_x$ reduction by selective reduction of $NO_x$ with $NH_3$ in stationary and automotive applications.

This catalyst is active both in the removal of hydrocarbons (VOC) and of NOx by combined oxidation and selective catalytic reduction (SCR) reaction with $NH_3$.

It is well-known that vanadium oxide is an active oxidation catalyst. Compared to the precious metal catalysts, such as the Pd catalyst, the vanadium oxide catalyst is less selective in the formation of $CO_2$, and some amounts of CO are produced during the oxidation reactions. CO is not capable of being oxidized to $CO_2$ at a feasible reaction rate by contact with the vanadium oxide catalyst. Instead it requires presence of a different catalyst, e.g. a noble metal catalyst like Pd or Pt, or a base metal catalyst like a CuMn catalyst. Thus it has turned out that when providing the filter with a vanadium oxide catalyst and with a very small amount of palladium, no emission of CO resulting from incomplete catalytic combustion of VOCs is observed.

Typically, the filter substrate has the form of a hollow cylinder. The catalyst is typically loaded onto the ceramic filter substrate by impregnating the filter substrate with a slurry comprising a catalytic metal supported on an inorganic oxide support, e.g. by dipping the filter in the slurry or by spraying the slurry on the filter from the outer and/or the inner side of the filter. Once the slurry has been applied, the resulting filter is dried. The impregnation and drying processes are rather challenging because, once wet, the ceramic filter substrate loses most of its mechanical properties and becomes rather difficult to handle.

The amount of catalyst that is loaded onto the filter has a direct impact on the catalytic performance of the resulting filter. Being able to target the catalyst load also ensures that no excess of catalyst is loaded, whereby the overall production cost of the catalytic filter is reduced. This is especially relevant in cases where noble metals, such as Pd, are used as catalyst, due to their high cost.

According to the present invention, the slurry containing the catalyst is applied by spraying it onto the ceramic filter from the inner side thereof. Moreover, the amount of slurry applied is defined on the basis of the catalytic performance required. In any case, in the method of the present invention the outer few millimeters of the total filter thickness are not impregnated, but instead left dry. By doing so, the mechanical properties of the filter during the impregnation and drying processes are significantly enhanced due to this dry outer shell of the filter.

The terms "outer side" and "inner side" as used herein refer to the flow side of the filter facing the unfiltered exhaust gas and to the flow side facing the filtered off- or exhaust gas, respectively.

Now it has surprisingly been found that the drying of the impregnation slurry advantageously can be accomplished by the use of microwave energy. This finding, in combination with the partial impregnation of the filter, giving a dry outer shell, and the targeting of the catalyst load, forms the basis of the present invention.

The drying of a coated catalyst substrate using microwave energy to affix the precious metal(s) to the support is e.g. known from U.S. Pat. No. 7,601,671 B2 describing a drying method for exhaust gas catalysts. The method, however, mandatorily requires a subsequent calcination of the dried slurry-coated catalyst substrate, which is not required according to the present invention.

In EP 1 214 971 B1, a catalyst for the removal of dioxin is disclosed. Microwave drying is mentioned in connection with the preparation of the catalyst, but calcination of the dried catalyst is necessary. This also holds true for the Pd-containing hydrogenation catalyst disclosed in EP 2 570 470 A1.

A coil-shaped ceramic filter element for an exhaust gas filter is described in US 2010/0034981 A1. The filter element is impregnated with a ceramic slurry and then dried. The drying can be effected by microwaves, but a subsequent sintering step is mandatory.

CN 103804016 A describes an engineering ceramic and a preparation method thereof. The solid raw materials are mixed under certain vacuum and temperature conditions, and the formed blank is dried using microwaves. Thereby, more than 400 pore passages per square inch in the honeycomb ceramic can be achieved, and the contact area of gas in a catalytic converter is more than 2000 m² on average.

Finally, US 2007/0098914 describes a microwave process for porous ceramic filters with passivation and catalyst coatings. In the process it is necessary to perform several successive microwave treatments.

The present invention relates to a method of preparing a catalyst-containing ceramic dust filter for off-gas or exhaust gas cleaning, said method comprising the steps of
preparing a water-based impregnation slurry, which comprises a catalytically effective amount of at least one catalytically active metal and an oxide support, to form a catalytically active metal oxide support,
impregnating the filter substrate with the impregnation slurry, spraying from the inner side to control the amount of liquor while leaving the outer few millimeters of the filter wall dry, and
drying the impregnated filter.

Preferably the filter is dried by using microwave energy.

It is preferred that the at least one catalytically active metal comprises a combined SCR and oxidation catalyst and a precious metal comprising catalyst.

Further it is preferred that the combined SCR and oxidation catalyst comprises an oxide of vanadium, tungsten or molybdenum and titania and that the precious metal comprising catalyst is a palladium catalyst.

Preferably the invention is applied to a ceramic candle filter suitable for the removal of particulate matter in form of soot, ash, metals and metal compounds, together with hydrocarbons and nitrogen oxides being present in process off-gases or engine exhaust gases. The candle filter comprises a combined SCR and oxidation catalyst arranged at least on the dispersion side and/or within the wall of the filter; and a palladium-comprising catalyst arranged mostly on the permeation side of the filter and/or within the wall of the filter facing the permeation side.

The combined SCR and oxidation catalyst preferably comprises a vanadium oxide and titania. It is further preferred that the palladium-comprising catalyst also comprises a vanadium oxide and titania.

The term "a vanadium oxide" refers to:
vanadium(II)oxide (vanadium monoxide), VO; or
vanadium(III)oxide (vanadium sesquioxide or trioxide), $V_2O_3$; or
vanadium(IV)oxide (vanadium dioxide), $VO_2$; or
vanadium(V)oxide (vanadium pentoxide), $V_2O_5$.

Preferably, vanadium oxide for use in the invention comprises or consists of vanadium(V)oxide (vanadium pentoxide), $V_2O_5$.

The term "titania" refers to titanium dioxide ($TiO_2$).

The catalytically active form of palladium is palladium in the metallic and/or oxidic form.

The shortage V/Ti and Pd/V/Ti shall mean a catalyst consisting of a vanadium oxide and titania and a catalyst consisting of palladium, a vanadium oxide and titania, respectively. The presence of palladium is only necessary if CO removal is needed or for enhancing the selectivity towards $CO_2$ in the oxidation of VOCs, e.g. toluene.

It is also preferred that the vanadium oxide/titania catalyst is additionally dispersed on the permeation side of the filter together with the palladium comprising catalyst.

Preferably, the palladium comprising catalyst contains palladium in an amount of between 20 and 1000 ppm/weight of the filter.

These catalysts are preferred for the following reasons: The Pd/V/Ti catalyst has i) dual functionality (removal of NOx and removal of CO and VOC, volatile organic compounds); ii) an S-tolerance; and iii) a lower $SO_2$ oxidation activity compared to other catalyst compositions, e.g. Pt-based catalysts.

If the applied catalyst-containing impregnation slurry is dried by traditional convection heating from either the inner side or the outer side, humidity will migrate into the ceramic material towards the opposite side, i.e. the warm side, resulting in a non-uniform catalyst distribution, which would compromise the catalytic performance. In contrast thereto, it is possible to dry the whole filter thickness at the same rate by using microwave energy. This latter approach is in fact well-known to provide very fast and effective volumetric drying rates. By microwave drying, the liquid transport during drying in the filter wall is avoided, and a uniform catalyst distribution is obtained. Having the catalyst well-distributed also ensures an optimal usage of catalyst material, thus enabling the achievement of the best ratio between cost and performance for the resulting catalytic filter.

The resulting catalyst-containing filter will be constituted by an inner shell of filter wall containing the catalyst and an outer shell of filter not containing the catalyst. The fact that the outer shell does not contain the catalyst also provides a very effective physical barrier against dust particles which otherwise, if in direct contact with the catalyst, might deactivate it.

According to the present invention, a catalyst-containing ceramic filter for off-gas or exhaust gas cleaning is prepared by disposing a water-based impregnation slurry, which comprises a catalytically effective amount of at least one catalytically active metal and an oxide support, upon the filter and drying the impregnation slurry and the filter using microwave energy to affix the catalytically active metal to the oxide support and the catalyst substrate.

The water-based impregnation slurry as disposed comprises small, i.e. typically micrometer-sized catalytically active metal particles. As used herein, disposing the impregnation slurry onto the substrate contemplates spraying the slurry from the inner side of the filter.

Advantageously, the process of drying the impregnation slurry and the substrate is effectively shortened by the present microwave drying, and at the same time the quality of the product is improved by ensuring a uniform distribution of catalyst. Impregnation slurry drying by conventional convection means takes a long time (i.e. several hours) depending on the temperature utilized. The higher the temperature is, the shorter the drying time becomes. However, the higher the temperature is, the higher is also the transport of catalyst material to the drying zone, hence a higher maldistribution of catalyst. When using microwave energy, drying only takes a few minutes.

In addition, the present microwave drying method advantageously avoids migration of catalyst while ensuring a uniform catalyst distribution.

Another advantageous aspect of the method according to the invention is that by keeping the outer shell of the ceramic filter dry by partial impregnation, the mechanical properties of the impregnated filter is improved, rendering the production process more easy and minimizing the amount of filters that may get broken during the production process.

In the following, the invention will be further illustrated by a specific example.

EXAMPLE

The plot shown in the appended FIG. 1 shows the SCR catalyst activity as a function of temperature for various ceramic filter elements as follows:

| Element | Treatment |
|---|---|
| A | Shell impregnated. Dried in microwave oven - 25 cm (according to the invention) |
| B | Shell impregnated. Dried at room temperature - 40 cm |
| C | Shell impregnated. Burned directly at 300° C. - 40 cm |

As can be deduced from the plot in FIG. 1, the element dried with microwaves according to the invention is clearly the best.

Figure 2:
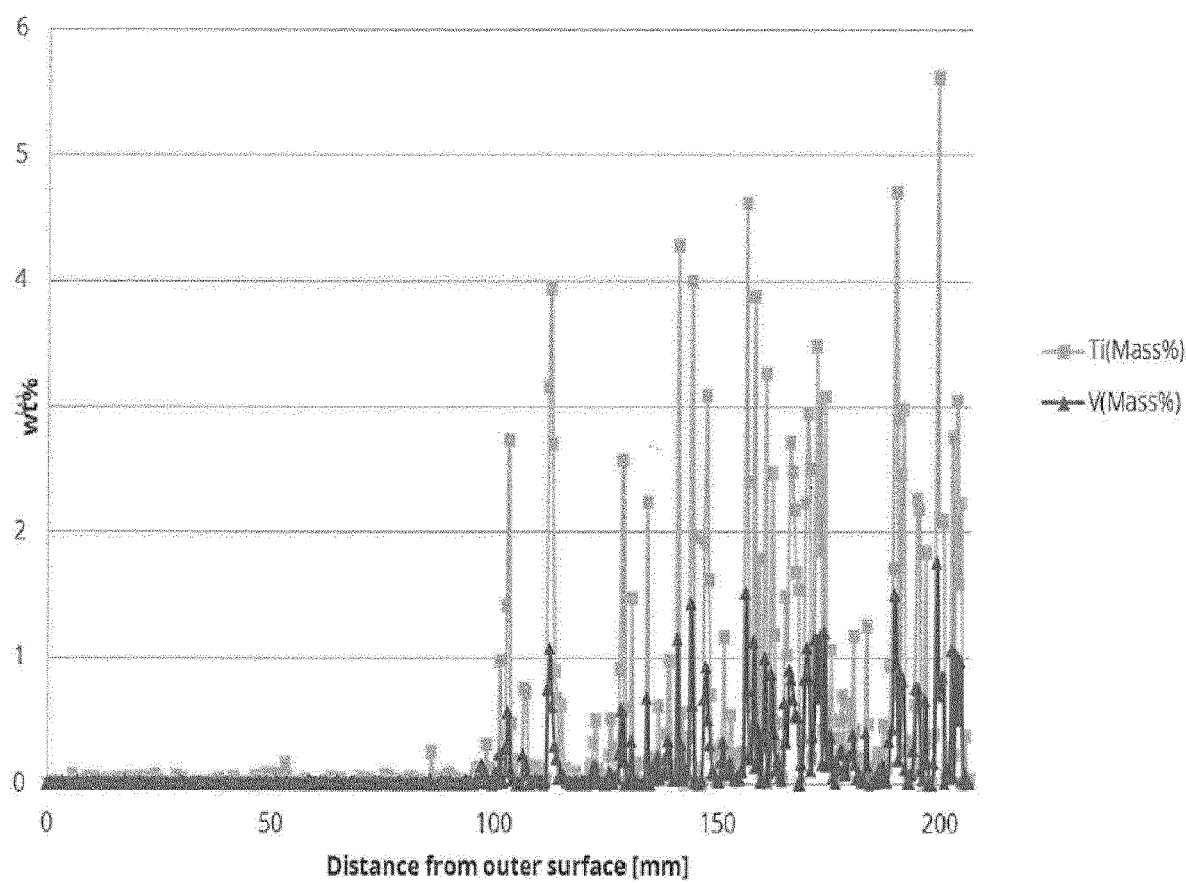
Figure 3:
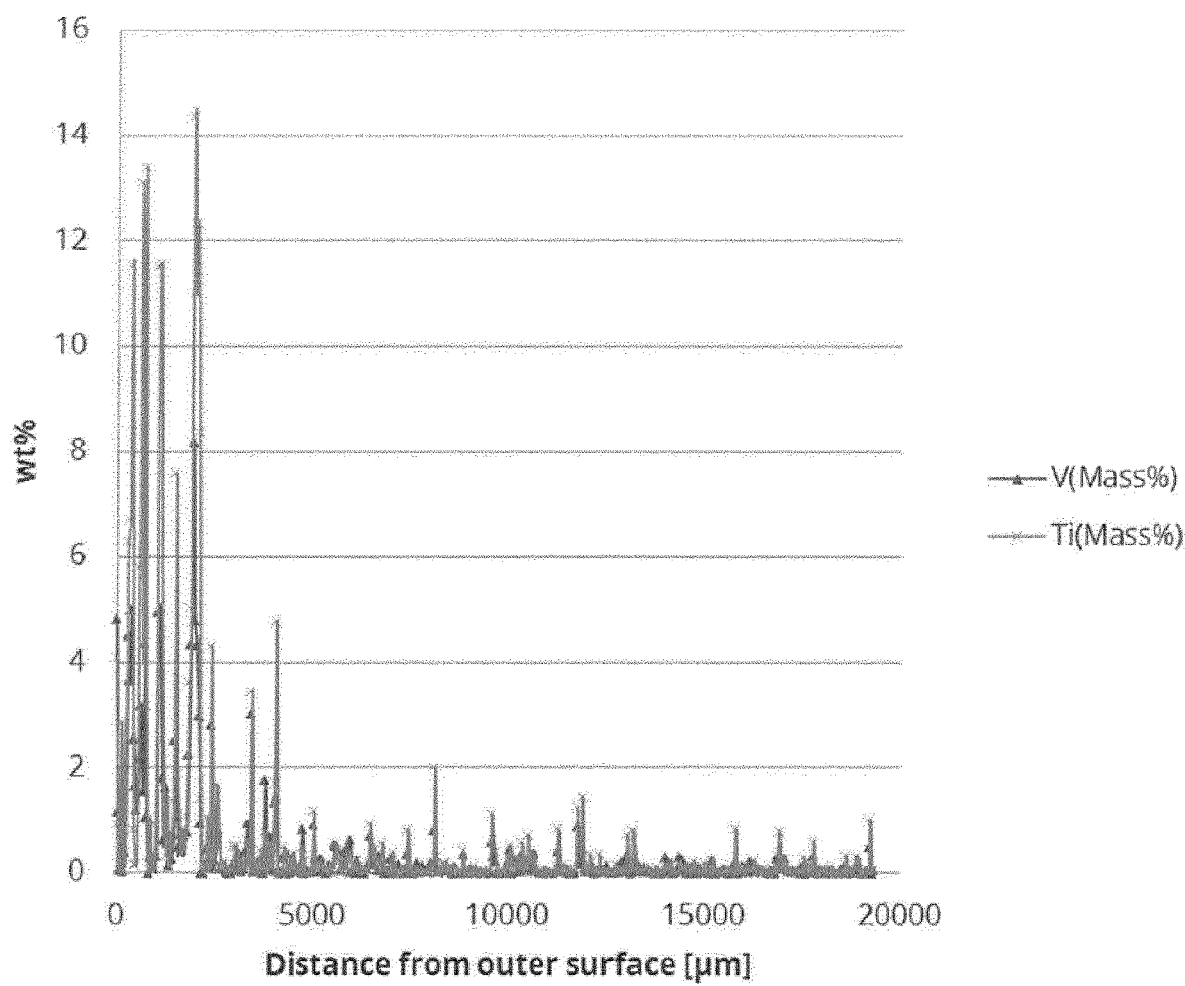

FIG. 2 shows the catalyst distribution in the element as a function of the distance from the outer surface (in mm) for an element treated according to the invention (element A), and FIG. 3 shows the catalyst distribution in the element as a function of the distance from the outer surface (in μm) for an element dried by direct burning at 300° C. (element C).

The invention claimed is:

1. A method of preparing a catalyst-containing ceramic candle dust filter having a ceramic outer wall and a ceramic inner wall for off-gas or exhaust gas cleaning, said method comprising the steps of preparing a water-based impregnation slurry, which comprises a catalytically effective amount of micrometer-sized catalytically active metal particles and an oxide support, to form a catalytically active metal oxide support, impregnating pores in a substrate of the ceramic candle dust filter with the impregnation slurry by spraying the impregnation slurry, from an inner side of the ceramic candle dust filter outwardly, to control the amount of the impregnation slurry sprayed on the inner wall, so that the entire ceramic outer wall of the filter is not impregnated and remains dry, and drying the impregnated filter by using microwave energy, without subsequent calcination of the dried catalyst impregnated substrate, thereby avoiding migration of the catalyst while ensuring a uniform catalyst distribution.

2. The method according to claim 1, wherein the catalytically active metal comprises a combined selective catalytic reduction (SCR) and oxidation catalyst and a precious metal comprising catalyst.

3. The method according to claim 2, wherein the combined SCR and oxidation catalyst comprises a vanadium oxide and titania.

4. The method according to claim 2, wherein the precious metal comprising catalyst is a palladium catalyst.

5. The method according to claim 4, wherein the palladium catalyst is combined with a vanadium oxide and titania.

6. The method according to claim 5, wherein the vanadium oxide/titania catalyst is additionally dispersed on a permeation side of the filter together with the palladium catalyst.

7. The method according to claim 4, wherein the palladium catalyst contains palladium in an amount of between 20 and 1000 ppm/weight of the filter.

* * * * *